United States Patent [19]

McShane James E.

[11] Patent Number: 4,919,954

[45] Date of Patent: Apr. 24, 1990

[54] COMPOSITIONS AND METHODS OF DECORATING FIRM-RINDED FRUIT

[75] Inventor: McShane James E., Memphis, Tenn.

[73] Assignee: Plough, Inc., Memphis, Tenn.

[21] Appl. No.: 287,196

[22] Filed: Dec. 20, 1988

[51] Int. Cl.$^5$ ............................ A23L 1/27; A23P 1/08
[52] U.S. Cl. .................................... 426/308; 426/303; 426/304
[58] Field of Search ................ 426/87, 249, 250, 283, 426/303, 302, 308, 304; 424/61

[56] References Cited

U.S. PATENT DOCUMENTS

| | | | |
|---|---|---|---|
| 2,096,507 | 12/1936 | Czeszcziczki Jr. | 426/383 |
| 2,764,168 | 9/1956 | Herz | 424/61 |
| 4,126,144 | 11/1978 | Duarte | 424/61 |

FOREIGN PATENT DOCUMENTS

| | | |
|---|---|---|
| 57-004909 | 1/1982 | Japan . |
| 2146267 | 8/1984 | United Kingdom . |

OTHER PUBLICATIONS

Japanese Publication Translations: No. 6157, Sept. 1955, 118449, Sept. 1976, 20376, Jun. 1977, 107544, Aug. 1978.

M. G. deNavarre, "Face Masks", Chapter 25, (1975), vol. III, of The Chemistry and Manufacture of Cosmetics, pp. 421–444, 2nd Ed. Continental Press.

*Primary Examiner*—Donald E. Czaja
*Assistant Examiner*—D. Workman
*Attorney, Agent, or Firm*—Thomas D. Hoffman; John J. Maitner; Stephen I. Miller

[57] ABSTRACT

A method of decorating the outside surface of a firm-rinded fruit of vines of the genus Cucurbita e.g. a pumpkin with a non-toxic, peelable film of predetermined design which comprises applying to the outer surface of said fruit at least one homogeneous film-forming composition containing a film-forming amount of a non-toxic polyvinyl alcohol polymer, a plasticizer, a volatile solvent ethanol and an amount of a colorant or a mixture of colorants sufficient to mask the color of said fruit, and allowing the solvent to evaporate thereby forming a non-toxic, peelable film of predetermined design on the surface of said fruit.

7 Claims, No Drawings

COMPOSITIONS AND METHODS OF DECORATING FIRM-RINDED FRUIT

BACKGROUND OF THE INVENTION

This invention relates to compositions and methods of decorating firm-rinded fruit of the vines of the genus Cucurbita, especially pumpkins, with a non-toxic film of predetermined design by applying to the outer surface of said fruit at least one homogeneous non-toxic film-forming composition containing inter alia a film-forming amount of an acrylic acid/acrylate copolymer salt, a volatile solvent, a viscosity-enhancing agent, and at least one colorant in an amount sufficient to mask the color of said fruit and thereafter allowing the volatile solvent to evaporate to form a non-toxic film of predetermined design. This invention also relates to a method of decorating a firm-rinded fruit of the vines of the genus Cucurbita with a non-toxic, peelable film of predetermined design by coating substantially the entire surface of said fruit rind with a first coating of a homogeneous colorant-free polyvinyl alcohol composition and thereafter applying on top of the first coating at least one homogeneous film-forming polyvinyl alcohol composition containing a colorant or mixture of colorants, a plasticizer and a volatile solvent and then allowing the solvent to evaporate to form a non-toxic peelable film of predetermined design on the surface of said fruit rind. This invention also relates to homogeneous non-toxic film-forming compositions used in the method of decorating said fruits.

Peelable herbal face musks containing polyvinyl alcohol or acrylic/acrylate copolymer are disclosed in chapter 25 entitled "Face Masks" by M. G. deNavarre in Vol. III of "The Chemistry and Manufacture of Cosmetics", 2nd Edition, Continental Press, 1975, pp. 421–444, especially at pp. 433–436. However, there is no disclosure of the methods and compositions of the present invention.

A film-forming composition for application to the skin containing polyvinyl alcohol, water, ethanol, silk fibroin hydrolyzed peptides and/or reclaimed silk fibroin powder is disclosed in Kanebo KK Japanese Kokai No. J57004-909 (Derwent Abstract 12945 E/07). UK Patent No. 2,146,267 (Campbell) discloses transparent or opaque peelable layers, based on a modified polyvinyl alcohol which are applied to window glass as a masking layer prior to painting the window frames. U.S. Pat. No. 4,126,144 discloses a peelable human nail coating system composed of a water latex emulsion of polyvinyl acetate homopolymer or polyvinyl acetate-ethylene copolymer, stabilized with partially acetylated polyvinyl alcohol and optionally containing pigments dyer and coloring agents.

Polyvinyl alcohol compositions containing pigments have been used for application to pumpkins but the skin texture of some pumpkins results in poor adhesion of the polyvinyl alcohol compositions containing pigments.

SUMMARY OF THE INVENTION

The present invention provides a method of decorating a firm-rinded fruit of vines of the genus Cucurbita with a non-toxic film of predetermined design which comprises applying to the outer surface of said fruit at least one homogeneous non-toxic, film-forming composition containing a film-forming amount of an acrylic/acrylate copolymer salt, a plasticizer, a volatile solvent, a viscosity-enhancing agent and an amount of a colorant or a mixture of colorants sufficient to mask the color of said fruit, and allowing said solvent to evaporate thereby forming a non-toxic film of predetermined design on the outer surface of said fruit.

The present invention also provides a homogeneous film-forming composition for decorating the surface of a firm rinded fruit of vines of the genus Cucurbita with a non-toxic uniform film which comprises a film-forming amount of an acrylic/acrylate copolymer salt, an effective amount of a plasticizer, a volatile solvent, an effective amount of a viscosity-enhancing agent and an amount of colorant or a mixture of colorants sufficient to mask the color of the surface of said fruit.

The present invention further provides a method of decorating a firm-rinded fruit of vines of the genus Cucurbita with a non-toxic, peelable film of predetermined design which comprises the steps of (1) applying to substantially the entire outer surface of said fruit a first coating comprising a homogeneous colorant-free film-forming composition containing a film-forming amount of polyvinyl alcohol, a volatile solvent, a viscosity-enhancing agent and at least one preservative; (2) allowing the volatile solvent to evaporate to form a first coating of a non-toxic peelable film on substantially the entire outer surface of said fruit; (3) applying to the surface of said first coating at least one homogeneous film-forming composition containing a film-forming amount of a polyvinyl alcohol, a plasticizer, a volatile solvent and an amount of a colorant or a mixture of colorants sufficient to mask the color of said fruit, and (4) allowing the solvent to evaporate thereby forming a non-toxic, peelable film of predetermined design on the first coating on the outer surface of said fruit.

DETAILED DESCRIPTION OF THE INVENTION

Firm-rinded fruit of the vines of the genus Cucurbita include summer and winter squash, pumpkins and gourds. For easy application of a non-toxic film of the film-forming composition of the present invention to the surface of for example a pumpkin, the surface of the pumpkin should be washed with warm soapy water rinsed and wiped dry. Then, one applies to predetermined areas of the surface of the cleaned pumpkins the film-forming composition containing a film-forming amount of a non-toxic acrylic/acrylate copolymer salt, a plasticizer, a volatile solvent, a viscosity enhancer and an amount of one or more pigments sufficient to mask the color of the pumpkin. Templates may be used for various designs or shapes. The solvent is allowed to evaporate thereby forming a non-toxic film of predetermined design on the surface of the pumpkin. It is a special feature of the film-forming composition of this invention that compositions which contain water soluble or at least water-dispersable, non-toxic polyvinyl alcohol polymers form peelable films so that the predetermined design may be peeled off the pumpkin surface for permanent storage in for example a book.

Surprisingly, when the film-forming polymer used in the composition is polyvinyl alcohol, substantially the entire pumpkin surface has to be precoated with a first coating comprising a colorless (i.e. colorant-free) film-forming composition containing a film-forming amount of polyvinyl alcohol, a volatile solvent, a viscosity-enhancing agent and at least one preservative. After the volatile solvent has evaporated and the first coating has dried, a second coating containing a colorant or mixture of colorants is applied to a predetermined area of the first coating. After the solvent has been allowed to evaporate, a non-toxic peelable film of predetermined design on the surface of the pumpkin is formed.

Additional coatings of different color may be applied onto the second coating (or onto the first coating) if desired.

Typical suitable plasticizers include propylene glycol, low molecular weight polyethylene glycols having a molecular weight less than 600, and glycerin. The preferred plasticizer for polyvinyl alcohol is glycerin and the preferred plasticizer for acrylic/acrylate copolymer salt is propylene glycol. Other plasticizers well known to those skilled in the art which act as humectants to maintain the flexibility of the film-forming composition and adhesion of said compositions to the surface of the pumpkin are also considered within the scope of this invention.

Typical suitable volatile solvents include water and ethanol or mixtures thereof. Water is the preferred volatile solvent when acrylic/acrylate copolymer salt is the film-forming polymer and a mixture of water and ethanol is the preferred volatile solvent when polyvinyl alcohol is used. Other suitable volatile solvents include the $C_1$–$C_6$ straight and branched chain alcohols such as isopropanol, n-butanol and iso-butanol.

Typical suitable viscosity-enhancing agents include xanthan gum, sodium alginate, carrageenan, tragacanth, cooked starch e.g. potato starch, guar gum, fumed silica, cellulose ethers such as sodium carboxymethyl cellulose, hydroxypropyl cellulose, hydroxypropylmethyl cellulose and combinations thereof. Fumed silica is the preferred viscosity-enhancing agent when polyvinyl alcohol is used; xanthan gum is the preferred viscosity-enhancing agent when an acrylic/acrylate copolymer salt is used.

One or more preservatives may be included in the film-forming compositions of the present invention. Typical suitable preservatives include benzyl alcohol, in amount of about 1 weight percent of the composition, the parabens especially methyl paraben and propyl paraben in the total amount of about 0.10 to about 0.30 weight percent of the composition.

The term "colorant" as used herein includes those water-soluble dyes and inorganic pigments which are FDA-approved dyes and pigments conventionally used in or with food. Some of the conventional dyes and pigments include titanium dioxide for white, mixtures of titanium dioxide and FD&C Yellow Lake #10 for yellow, black iron oxides for black, FD&C Red #40 aluminum lake for red, mixtures of titanium dioxide and FD&C Blue #1 lake for blue. Mixtures of yellow and red may be used to provide orange; mixtures of blue and red may be used to make brown and mixtures of yellow and blue may be used to make green. Other food grade dyes and combination of dyes and pigments well known to the art are also suitable. Generally the amounts of dyes and pigments vary from about 5 to 15 weight percent of the film-forming composition when poylvinyl alcohol is used and vary from about 8 to about 25 weight percent of the film-forming composition when an acrylic/acrylate copolymer salt is used.

The amount of film-forming polymer varies depending upon the pigment and/or dye used, from about 10 to 15 weight percent, preferably about 12.50 to 13.00 weight percent of the film-forming composition when polyvinyl alcohol is used to about 20 to about 50 weight percent when an acrylic/acrylate copolymer salt is the polymer used.

The ratio of polymer to colorant when the polymer is an acrylic/acrylate copolymer salt is in the range of about 1.5 to 1.6:1 for white pigment to about 5.6 to about 6:1 for red and blue dyes.

The ratio of polymer to colorant when the polymer is polyvinyl alcohol is in the range of about 0.75 to 0.85:1 for white pigment to about 2.0 to 2.5:1 for red dye.

The non-toxic acrylic/acrylate copolymer salts found useful in the present invention are water-soluble or at least water dispersible film-forming polymers salts, especially the neutral (i.e. having a pH value in the range of about 7 to about 8) ammonium salts of acrylic/acrylate copolymers available from B.F. Goodrich Chemical Co., Cleveland, Ohio 44131 under the tradename Carboset acrylic/acrylate copolymers.

Such Carboset acrylic/acrylate copolymers are defined in *CTFA Cosmetic Ingredient Dictionary*, Third Edition, 1982 (CTFA Inc, Washington D.C.) as a polymer of acrylic acid and a monomer consisting of methacrylic acid, or a simple ester of acrylic acid or mathacrylic acid; Carboset XL-28 is the preferred acrylic/acrylate copolymer salt. Other non-toxic or food grade acrylic/acrylate copolymer salts which are at least water dispersible or water soluble, film-forming polymers well known to those skilled in the art may also be used. Polyacrylic acid such as sold under the name Carbopol is not a film-forming polymer and is not considered within the scope of this invention.

The polyvinyl alcohol polymers found useful in this invention are essentially neutral (i.e. having a pH of about 5 to about 8) water soluble or at least water dispersible film-forming polymers produced by the partial, controlled hydrolysis of polyvinyl acetate. The preferred polyvinyl alcohol polymer has a pH in the range of about 5 to about 8, an average molecular weight of about 11,000 to about 31,000, contains about 11 to about 13 weight percent unhydrolyzed polyvinyl acetate and is available under the tradename Vinol 205 polyvinyl alcohol resin from Air Products and Chemical Co., Allentown, Pa. The Vinol 205 resin provides superior adhesion to the hydrophobic outer surface of for example, pumpkins. Other polyvinyl alcohol polymers having a similar percent unhydrolyzed polyvinyl acetate but a different average molecular weight may be used in this invention.

The following examples illustrate the invention. Substitution of other polyvinyl alcohol polymers for Vinol 205 polyvinyl alcohol and other water-dispersible or water-soluble acrylic/acrylate copolymer salts for Carboset XL-28 in the following examples may be made without departing from the scope of this invention.

EXAMPLE 1

| Pretreatment or First Coating | |
|---|---|
| Ingredient | Percent by Weight |
| Part A | |
| Water | 75.45 |
| Vinol 205 Polyvinyl Alcohol | 8.00 |
| Methyl Paraben | 0.20 |
| Propyl Paraben | 0.05 |
| Part B | |
| Fumed silica | 1.00 |
| Part C | |
| Anhydrous ethanol | 15.30 |

| Pretreatment or First Coating | |
|---|---|
| Ingredient | Percent by Weight |
| Total | 100.00 |

Add the ingredients of Part A to a stainless steel, steam-jacketed tank equipped with a propeller agitator. Heat the so-formed mixture to 77° to 82° C. while continuously mixing until a homogeneous mixture is formed. Continue mixing and cool the homogeneous mixture to 29°-34° C. Add Part B thereto and continue to mix until a homogeneous mixture is formed. Add Part C thereto and mix until a homogeneous mixture is formed.

EXAMPLE 2

| Yellow Polyvinyl Alcohol Composition | |
|---|---|
| Ingredient | Percent by Weight |
| Part A | |
| Water | 35.45 |
| Vinol 205 Polyvinyl alcohol | 12.75 |
| Glycerin, 99% USP grade | 5.00 |
| Part B | |
| Water | 21.25 |
| Fumed silica | 1.00 |
| Part C | |
| Titanium Dioxide | 4.00 |
| FD&C Yellow Lake #10 | 5.00 |
| Part D | |
| Anhydrous Ethanol | 3.00 |
| Methyl Paraben | 0.20 |
| Propyl Paraben | 0.05 |
| Part E | |
| Anhydrous ethanol | 12.30 |
| Total | 100.00 |

Add the ingredients of Part A to a mixing tank described in Example 1. Heat the stirred mixture to 68°-74° C. and continue to stir until a homogeneous mixture is formed. Cool the so-formed homogeneous mixture to 29°-38° C. while stirring is continued to de-airate the mixture. Add a dispersion of the ingredients of Part B to C and stir until a homogeneous mixture is formed. Add Part C thereto and continue to mix until a homogeneous mixture is formed. Add Part D to the mixture and stir until a homogeneous mixture is formed. Add Part E and stir the so-formed solution until uniform from at least ½ hour. Pass the entire mixture through a colloid mill.

EXAMPLE 3

| Red Polyvinyl Alcohol Composition | |
|---|---|
| Ingredient | Percent by Weight |
| Part A | |
| Water | 35.45 |
| Vinol 205 Polyvinyl Alcohol | 12.75 |
| Glycerin, 99% USP | 5.0 |
| Part B | |
| Water | 24.25 |
| Fumed silica | 1.00 |
| Part C | |
| Red #40, FD&C Aluminum Lake | 6.00 |
| Part D | |
| Anhydrous ethanol | 3.00 |
| Methyl Paraben | 0.20 |
| Propyl Paraben | 0.05 |

| Red Polyvinyl Alcohol Composition | |
|---|---|
| Ingredient | Percent by Weight |
| Part E | |
| Anhydrous ethanol | 12.30 |
| Total | 100.00 |

Add the ingredient of Part A to a tank like the one described in Example 1. Heat the mixture with stirring to 68°-74° C. and mix until a homogeneous mixture is formed. Cool the so-formed mixture to 29°-38° C. and continue to stir to allow the entrapped air to escape. Add a dispersion of Part B to A and stir until a homogeneous mixture is formed. Add the Part C thereto and stir until a homogeneous mixture is formed. Add Part D thereto and mix until a homogeneous mixture is formed. Part E thereto and mix until a homogeneous mixture is formed.

EXAMPLE 4

| White Polyvinyl Alcohol Composition | |
|---|---|
| Ingredient | Percent by Weight |
| Part A | |
| Water | 51.70 |
| Vinol 205 Polyvinyl Alcohol | 12.75 |
| Glycerin | 5.00 |
| Part B | |
| Titanium Dioxide | 15.00 |
| Part C | |
| Anhydrous Alcohol | 3.00 |
| Methyl Paraben | 0.20 |
| Propyl Paraben | 0.05 |
| Part D | |
| Anhydrous Ethanol | 12.30 |
| Total | 100.00 |

Add the ingredients of Part A to a tank such as the one of Example 1. Heat the mixture to 68°-74° C. and stir until a homogeneous mixture is formed. Cool the so-formed mixture to 29°-38° C. and continue to mix until most of the entrapped air is removed. Add Part B thereto and mix until homogeneous. Add C thereto and mix until homogeneous. Add D thereto and mix until a homogeneous mixture is formed. Pass the so-formed mixture through a colloid mill.

EXAMPLE 5

| Blue Polyvinyl Alcohol Composition | |
|---|---|
| Ingredient | Percent by Weight |
| Part A | |
| Water | 35.45 |
| Vinol 205 Polyvinyl Alcohol | 12.75 |
| Glycerin | 5.00 |
| Part B | |
| Water | 20.75 |
| Fumed Silica | 0.50 |
| Part C | |
| Titanium Dioxide | 4.00 |
| Blue #1 Lake FD&C | 6.00 |
| Part D | |
| Anhydrous Ethanol | 3.00 |
| Methyl Paraben | 0.20 |
| Propyl Paraben | 0.05 |
| Part E | |
| Anhydrous Ethanol | 12.30 |

-continued

| Blue Polyvinyl Alcohol Composition | |
|---|---|
| Ingredient | Percent by Weight |
| Total | 100.00 |

Add the ingredients of Part A to a tank such as the one described in Example 1. Heat the stirred mixture to 68°–74° C. and continue mixing until homogeneous. Cool the so-formed mixture to 29°–38° C. and mix until most of entrapped air has escaped. Add Part B (as a dispersion) thereto and mix until homogeneous. Add C thereto and mix until homogeneous. Add D thereto and mix until homogeneous. Add E thereto and mix until a homogeneous mixture is formed. Pass entire mixture through a colloid mill.

EXAMPLE 6

| Black Polyvinyl Alcohol Composition | |
|---|---|
| Ingredient | Percent by Weight |
| Part A | |
| Water | 35.45 |
| Vinol 205 Polyvinyl Alcohol | 12.75 |
| Glycerin | 5.00 |
| Part B | |
| Water | 19.75 |
| Fumed Silica | 1.50 |
| Part C | |
| Black Iron Oxide | 10.00 |
| Part D | |
| Anhydrous Ethanol | 3.00 |
| Methyl Paraben | 0.20 |
| Propyl Paraben | 0.05 |
| Part E | |
| Anhydrous Ethanol | 12.30 |
| Total | 100.00 |

Add the ingredients of Part A to a tank such as the one described in Example 1. Heat the stirred mixture to 68°–74° C. and stir until homogeneous. Cool the so-formed mixture to 29°–38° C. and stir until most of entrapped air has escaped. Add Part B (as a dispersion) thereto and stir until homogeneous. Add successively C, D and E and stir after addition of each until a homogeneous mixture is obtained. Pass the so-formed mixture through a colloid mill.

EXAMPLE 7

| Yellow Polyacrylic Acid Composition | |
|---|---|
| Ingredient | Percent by Weight |
| Part A | |
| Water | 45.25 |
| Xanthan Gum | 0.40 |
| Part B | |
| Carboset XL-28 Ammonium Acrylic/Acrylate Copolymer | 40.00 |
| Foam Burst 338 organic defoamer* | 0.20 |
| Yellow #10 Lake | 6.00 |
| Titanium Dioxide | 4.40 |
| Benzyl Alcohol | 1.00 |
| Part C | |
| Propylene Glycol | 2.00 |
| Methyl Paraben | 0.20 |
| Propyl Paraben | 0.05 |
| Total | 100.00 |

*Antifoaming agent is manufactured by Frost Chemical Company and available from Deitz and Co., Nashville, TN.

Add the ingredients of Part A to a container equipped with a stirrer. Stir until homogeneous. Add the ingredients of Part B to a container with a stirrer and heat at 50° C. and stir until homogeneous. Add a homogeneous mixture of the ingredients of C heated to 50° C. to A and B and stir until a homogeneous mixture is formed.

EXAMPLE 8

| White Polyacrylic Acid Composition | |
|---|---|
| Ingredient | Percent by Weight |
| Part A | |
| Water | 31.15 |
| Xanthan Gum | 0.40 |
| Part B | |
| Carboset XL-28 Ammonium Acrylic/Acrylate Copolymer | 40.00 |
| Foam Burst 338 | 0.20 |
| Titanium Dioxide | 25.00 |
| Benzyl Alcohol | 1.00 |
| Part C | |
| Propylene Glycol | 2.00 |
| Methyl Paraben | 0.20 |
| Propyl Paraben | 0.05 |
| Total | 100.00 |

Following procedure of Example 7 to mix A, B and C to form a homogeneous admixture thereof.

EXAMPLE 9

| Red Polyacrylic Acid Composition | |
|---|---|
| Ingredient | Percent by Weight |
| Part A | |
| Water | 37.05 |
| Xanthan Gum | 0.50 |
| Part B | |
| Carboset XL-28 Ammonium Acrylic/Acrylate Copolymer | 50.00 |
| Foam Burst 338 | 0.20 |
| FD&C Red #40 Lake | 9.00 |
| Benzyl Alcohol | 1.00 |
| Part C | |
| Propylene Glycol | 2.00 |
| Methyl Paraben | 0.20 |
| Propyl Paraben | 0.05 |
| Total | 100.00 |

Follow procedure of Example 7 to admix A, B and C to form a homogeneous admixture thereof.

EXAMPLE 10

| Blue Polyacrylic Acid Composition | |
|---|---|
| Ingredient | Percent by Weight |
| Part A | |
| Water | 23.35 |
| Carboset XL-28 Ammonium Acrylic/Acrylate Copolymer | 30.00 |
| Xanthan Gum | 0.70 |
| Part B | |
| Carboset XL-28 Ammonium Acrylic/Acrylate Copolymer | 30.00 |
| Foam Burst 338 | 0.20 |
| FD&C Blue #1 Lake | 7.50 |
| Titanium Dioxide | 5.00 |
| Benzyl Alcohol | 1.00 |
| Part C | |
| Propylene Glycol | 2.00 |
| Methyl Paraben | 0.20 |
| Propyl Paraben | 0.05 |

-continued

| Blue Polyacrylic Acid Composition | |
|---|---|
| Ingredient | Percent by Weight |
| Total | 100.00 |

Follow procedure of Example 7 to admix A, B and C to form a homogeneous admixture.

EXAMPLE 11

| Black Polyacrylic Acid Composition | |
|---|---|
| Ingredient | Percent by Weight |
| Part A | |
| Water | 66.25 |
| Xanthan Gum | 0.50 |
| Part B | |
| Carboset XL-28 Ammonium Acrylic/Acrylate Copolymer | 20.00 |
| Black Iron Oxide | 10.00 |
| Benzyl Alcohol | 1.00 |
| Part C | |
| Propylene Glycol | 2.00 |
| Methyl Paraben | 0.20 |
| Propyl Paraben | 0.05 |
| Total | 100.00 |

Follow procedure of Example 7 to admix A, B and C to form a homogeneous admixture.

EXAMPLE 12

Kits

Two grams each of the composition of Examples 1–6 are placed in separate aluminum foil pouches indicating thereon the color of each composition. Each pouch is then sealed. The six pouches are packed in a single package containing instructions for use. A similar kit is prepared using the compositions of Examples 7–11.

We claim:

1. A method of decorating the outside surface of a firm-rinded fruit of vines of the genus Cucurbita with a non-toxic, peelable film of predetermined design which comprises the steps of (1) applying to substantially the entire outer surface of said fruit a first coating comprising a homogeneous colorant-free film-forming composition containing a film-forming amount of polyvinyl alcohol, a volatile solvent, a viscosity enhancing agent and at least one preservative; (2) allowing the volatile solvent to evaporate to form a first coating of a non-toxic peelable film on substantially the entire outer surface of said fruit; (3) applying to the surface of said first coating at least one homogeneous film-forming composition containing a film-forming amount of a polyvinyl alcohol, a plasticizer, a volatile solvent and an amount of a colorant or a mixture of colorants sufficient to mask the color of said fruit; and (4) allowing the solvent to evaporate thereby forming a non-toxic, peelable film of predetermined design on the first coating on the outer surface of said fruit.

2. A method of claim 1 wherein said fruit is a pumpkin.

3. A method of claim 1 wherein the colorant is present at the weight/weight ratio of polymer to pigment sufficient to produce a peelable film.

4. A method of claim 1 wherein the ratio is in a range of about 0.75 to 1 to about 2.5:1.

5. A method of claim 1 wherein the colorant is present in an amount of from about 5 to about 15 weight percent of said homogeneous composition.

6. A method of claim 1 wherein a single film-forming homogeneous composition is applied to the surface of said first coating.

7. A method of claim 1 wherein the viscosity-enhancing agent in the first film-forming composition is xanthan gum.

* * * * *